US009265058B2

(12) United States Patent
Bedekar et al.

(10) Patent No.: US 9,265,058 B2
(45) Date of Patent: Feb. 16, 2016

(54) SYSTEMS AND TECHNIQUES FOR MUTING MANAGEMENT IN MULTI-CELL COORDINATION

(71) Applicant: Nokia Solutions and Networks Oy, Espoo (FI)

(72) Inventors: Anand Bedekar, Arlington Heights, IL (US); Xiaoyi Wang, Wheeling, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/169,396

(22) Filed: Jan. 31, 2014

(65) Prior Publication Data

US 2015/0223261 A1      Aug. 6, 2015

(51) Int. Cl.
| | |
|---|---|
| H04W 72/12 | (2009.01) |
| H04W 28/04 | (2009.01) |
| H04B 7/02 | (2006.01) |
| H04W 28/16 | (2009.01) |
| H04W 72/04 | (2009.01) |
| H04L 5/00 | (2006.01) |
| H04W 52/40 | (2009.01) |

(52) U.S. Cl.
CPC ........... *H04W 72/1226* (2013.01); *H04B 7/024* (2013.01); *H04L 5/0035* (2013.01); *H04W 28/048* (2013.01); *H04W 28/16* (2013.01); *H04W 72/0406* (2013.01); *H04W 72/1263* (2013.01); *H04L 5/0073* (2013.01); *H04W 52/40* (2013.01)

(58) Field of Classification Search
CPC .......... H04W 72/1226; H04W 28/048; H04W 72/1263
USPC ............................................. 455/452.1, 452.2
See application file for complete search history.

(56) References Cited

U.S. PATENT DOCUMENTS

| | | | | |
|---|---|---|---|---|
| 2007/0184863 | A1* | 8/2007 | Takagi ................ | H04W 52/346 455/507 |
| 2012/0263036 | A1* | 10/2012 | Barclay ................. | H04L 47/245 370/230 |
| 2013/0237265 | A1 | 9/2013 | Khojastepour et al. | |

FOREIGN PATENT DOCUMENTS

| | | |
|---|---|---|
| EP | 2408230 A1 | 1/2012 |
| EP | 2498530 A1 | 9/2012 |
| EP | 2517409 A1 | 10/2012 |
| WO | WO-2012/044019 A2 | 4/2012 |
| WO | WO-2013/067709 A1 | 5/2013 |

OTHER PUBLICATIONS

Alcatel-Lucent et al. *Proposals for X2 signalling Supporting eCoMP with NIB* 3GPP Draft; R1-135181. $3^{rd}$ Generation Partnership Project (3GPP) San Francisco, USA. Nov. 13, 2013.

\* cited by examiner

*Primary Examiner* — Chuong A Ngo
(74) *Attorney, Agent, or Firm* — Harrington & Smith

(57) ABSTRACT

Systems and techniques for negotiated control of multipoint coordination. A first device (such as a central entity or base station) signals a second device regarding its desire to assert control over, or readiness to accept control by, the second device, with respect to coordinated radio transmission. The negotiation may include, for example, acceptance of control, rejection of control, specification of resources subject to or exempt from control, and priority-based decisions to override or refrain from overriding rejections. Coordinated transmission is then conducted based on the outcome of the negotiation.

20 Claims, 8 Drawing Sheets

SYSTEMS AND TECHNIQUES FOR MUTING MANAGEMENT IN MULTI-CELL COORDINATION

TECHNICAL FIELD

The present invention relates generally to wireless network communication. More particularly, the invention relates to improved systems and techniques for multi-cell coordinated scheduling.

BACKGROUND

Efficiency in wireless network communication is an important objective, becoming more and more important as the number of users and their demands for service continue to increase. Network operators wish to minimize the infrastructure they must provide. In addition, the frequency bands dedicated to wireless network communication are a finite and valuable resource, and network operators are constantly working to use this resource efficiently in order to prevent the available frequencies from becoming oversaturated. If frequencies are oversaturated, network elements will interfere with one another. For example, transmission by one base station may interfere with transmission by an adjacent base station. In order to prevent interference. Network operators may take into account the presence of nearby transmitters in making scheduling decisions, and transmitters (such as base stations) may coordinate their transmissions so as to avoid interference with one another.

SUMMARY

In one embodiment of the invention, an apparatus comprises at least one processor and memory storing a program of instructions. The memory storing the program of instructions is configured to, with the at least one processor, cause the apparatus to at least, in response to a control assertion request to allow a controlling entity to control coordinated radio transmission by the apparatus, respond with an acceptance or denial of the request and, if the response is an acceptance, perform coordinated transmission under control of the controlling entity.

In another embodiment of the invention, a method comprises, in response to a control assertion request to allow a controlling entity to control coordinated radio transmission by a base station, responding with an acceptance or denial of the request and, if the response is an acceptance, performing coordinated transmission under control of the controlling entity.

In another embodiment of the invention, a non-transitory computer readable medium stores a program of instructions. Execution of the program of instructions by at least one processor configures an apparatus to at least in response to a control assertion request to allow a controlling entity to control coordinated radio transmission by the apparatus, respond with an acceptance or denial of the request and, if the response is an acceptance, perform coordinated transmission under control of the controlling entity.

In another embodiment of the invention, an apparatus comprises at least one processor and memory storing a program of instructions. The memory storing the program of instructions is configured to, with the at least one processor, cause the apparatus to at least send a control assertion request to a base station, requesting control of coordinated radio transmission by the base station and, in response to acceptance of the request by the base station, send one or more requests to the base station to mute transmission.

DETAILED DESCRIPTION

Figure 1:
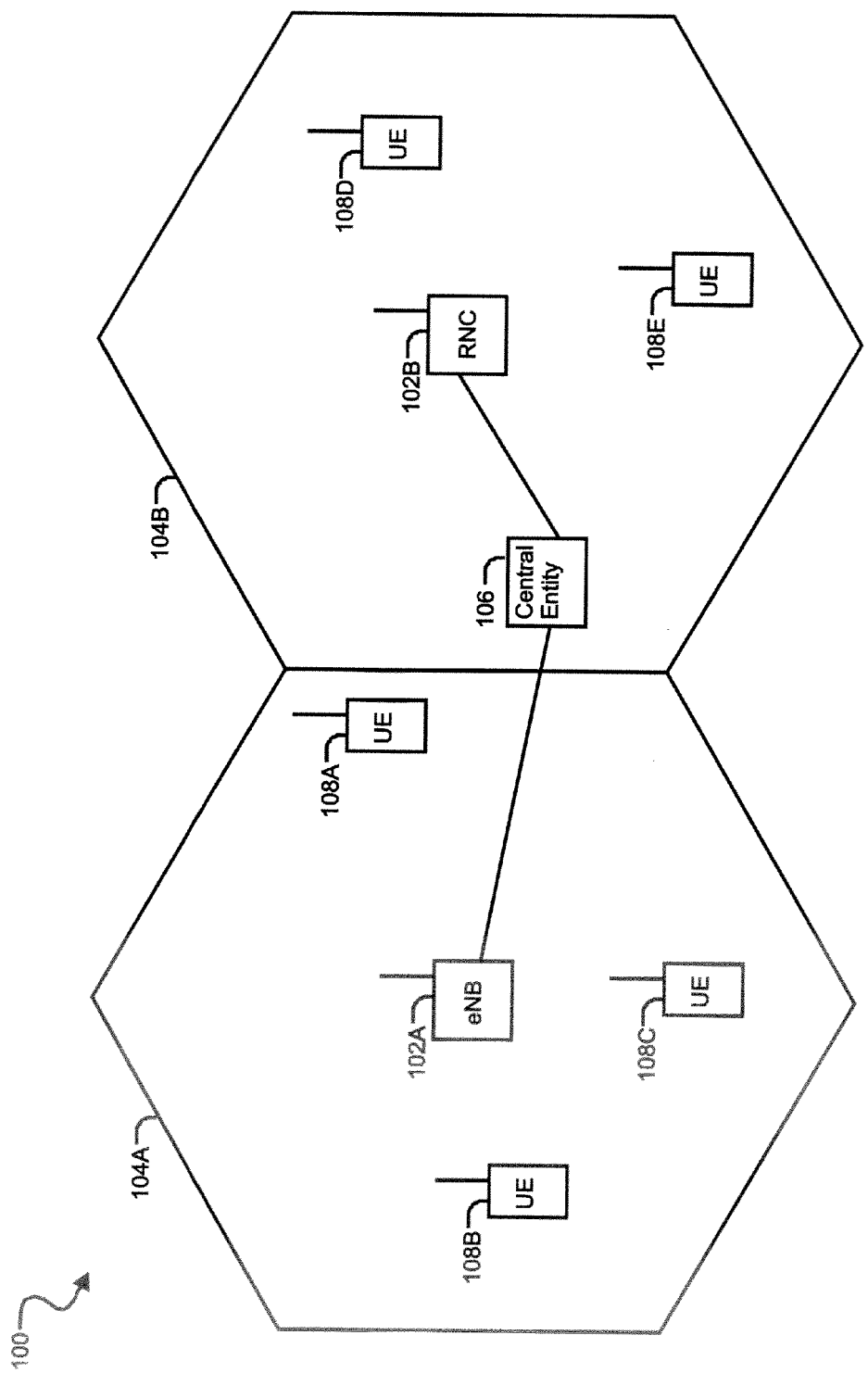
FIG. 1 illustrates a wireless network according to an embodiment of the present invention.

Embodiments of the present invention address improvements to coordinated multipoint communication—specifically, multi-cell coordinated scheduling. Various approaches to multi-cell coordinated scheduling are in development or in use in cellular communication systems. These include centralized and decentralized approaches. Base stations may coordinate transmission order to avoid interference with one another. One mechanism is to mute transmission requiring particular resources or at a particular time (with muting being defined as a zero-power transmission or interval), while another mechanism is to transmit at reduced power in particular resources or time periods. In a decentralized approach to coordinated scheduling, a cell, which may be represented by a base station, makes its own decision on muting (that is, refraining from transmitting or scheduling transmission from one or more of its user devices). In networks operating according to standards of the third generation partnership project (3GPP), 3GPP long term evolution (LTE) and 3GPP LTE-advanced (LTE-A), a base station may be implemented as an eNodeB (eNB), with an eNB serving user equipments (UEs) within its coverage area.

In a network or portion of a network that follows a centralized approach, a central entity makes decisions about whether a particular base station should mute, and issues an appropriate request to the base station (such as an eNB). A base station may be designed for centralized control (such a base station may be referred to for convenience as a centrally controlled base station) or may be designed for decentralized operation (such a base station may be referred to as an autonomous base station —meaning that the base station's coordination decisions are autonomous). A centrally controlled base stations will perform coordination as directed by the central entity, and an autonomous base station will generally ignore requests by the central entity. In some cases, a base station may respond to requests from a central entity during most of its operation, but, under some circumstances, ignore requests and make its own decisions. Such circumstances may include, for example, handing of high priority traffic using specified resources. Such a base station may be referred to for convenience as a partially autonomous base station. The various elements participating in and controlling coordinated transmission may be referred to as nodes, and one or more of the nodes may conveniently be referred to as an independent node, which may control and direct other nodes, but which may not itself serve a user device. In one or more embodiments of the invention, the central entity may be an independent node.

In an environment in which centrally controlled base and autonomous base stations are both present, such mixing may lead to conflicts, as a central entity sends requests to both autonomous base stations and centrally controlled base stations, and the two types of base stations conflict because the behavior of the autonomous base station is unpredictable.

In one or more embodiments of the invention, therefore, a unified signaling procedure is employed that encompasses centrally controlled and autonomous coordination. Various embodiments of the unified signaling procedure prevent conflicts involving interaction between a central entity and an autonomous base station; interaction between a central entity and a centrally controlled base station; interaction between an autonomous base station and a centrally controlled base station; interaction between two autonomous base stations; and interaction between a central entity and a centrally controlled base station that behaves autonomously with respect to specified resources.

FIG. 1 illustrates a network 100 according to an embodiment of the present invention. The network 100 comprises base stations implemented as eNBs 102A and 102B, defining cells 104A and 104B, respectively, and communicating with a central entity 106. The eNBs 102A and 102B serve a plurality of UEs 108A-108E, which may move between cells or be turned off or otherwise disconnected to the network. Other UEs may be introduced to the network as they are turned on or moved in from elsewhere. One or more network nodes, such as the eNBs 102A and 102B or the central entity 106, may engage in coordinated scheduling in order to reduce interference.

In one or more embodiments of the invention, network nodes involved in such coordination negotiate with one another. In one example, a requesting node (such as the central entity 106) needing to scheduling decisions for a responding node (such as one of the eNBs 102A or 102B) indicates to the second node that it needs to make such decisions and issue requests to the second node to take such action. The second node responds to the first node by indicating that it will or that it will not accept such requests. It will be noted that whether the responding node is to indicate acceptance or denial can be based on any criteria desired. For example, the responding node may indicate acceptance to a request from a first requesting node, or may indicate denial to a second responding node, or may generally accept requests but may deny requests and make decisions autonomously with respect to specific traffic categories or resources. For example, either the requesting or the responding node, or both, may assign specific physical resource blocks (PRBs) to a high priority or protected category, and the requesting node may decline to request, or the responding node may decline to accept, centrally controlled scheduling with respect to those blocks.

If a response is a denial, various embodiments of the invention provide for mechanisms to specify which node's indications will take priority—that is, whether denials will be accepted. If the requesting node is given priority, the responding node will be forced to accept its requests, and if the responding node is given priority, its denials will be accepted. It will be recognized that assignment of priority can be based on any criteria desired, and can change. For example, nodes can be ranked, so that a first central entity (for example) may be able to override a denial by a specific responding node, while a second central entity may be unable to override a denial by the same responding node. Responding nodes may be similarly ranked. Alternative approaches may involve the assignments of weightings to nodes, so that a higher weighted node may be given priority over a lower weighted node. Priority decisions can be made per-transaction, or criteria may be defined so that nodes have higher priority with respect to particular resources or traffic categories than with other resources or traffic categories. For example, specific physical resource blocks (PRBs) may belong to a high priority or protected category, with higher weighting assigned to use of those blocks by the responding node.

In one or more embodiments of the invention, various entities, such as the eNB 102A, the eNB 102B, and the central entity, communicate as governed by a specified signaling framework designed to provide for support of both centralized and distributed coordination. By pre-negotiation or operation and maintenance configuration, the decision maker for coordination interactions is specified. Selection of the decision maker can be accomplished according to any criteria desired—for example, identifying an entity as dominant, choosing a dominant entity based on conditions such as traffic levels, or specifying decision makers for each radio resource unit (for example, frequency domain resources such as physical resource blocks (PRBs) or resource block groups (RBGs), or time domain resources such as transmission time intervals (TTIs). As described in greater detail below, coordination may be managed in a hand-shaking coordination request (request and response). The decision maker may be the node making the request or the node receiving the request.

For radio resource units (for example, individual PRBs or RBGs, or alternatively across the whole bandwidth), if the requesting entity is the decision maker, the receiving eNB must respond as requested.

In cases in which the eNB receiving a request has the final authority, the receiving eNB may reject the request if needed: for example, making best efforts to fulfill a request but not guaranteeing that the request will be fulfilled. Such an approach is useful if a radio resource has been reserved for a specific purpose—for example, if an eNB has configured an SPS transmission on specified PRBs, or PRBs have been configured as a physical download control channel. In another typical case, the receiving eNB may have been designed for autonomous or decentralized operation, making its own determination of its coordination action (such as muting) so that it would not generally accept requests from another node. As discussed in greater detail below, relative priorities between nodes can be adjusted based on factors such as current load and traffic type. A network such as the network 100 can therefore exist as a hybrid between centralized and autonomous communication.

Figure 2:
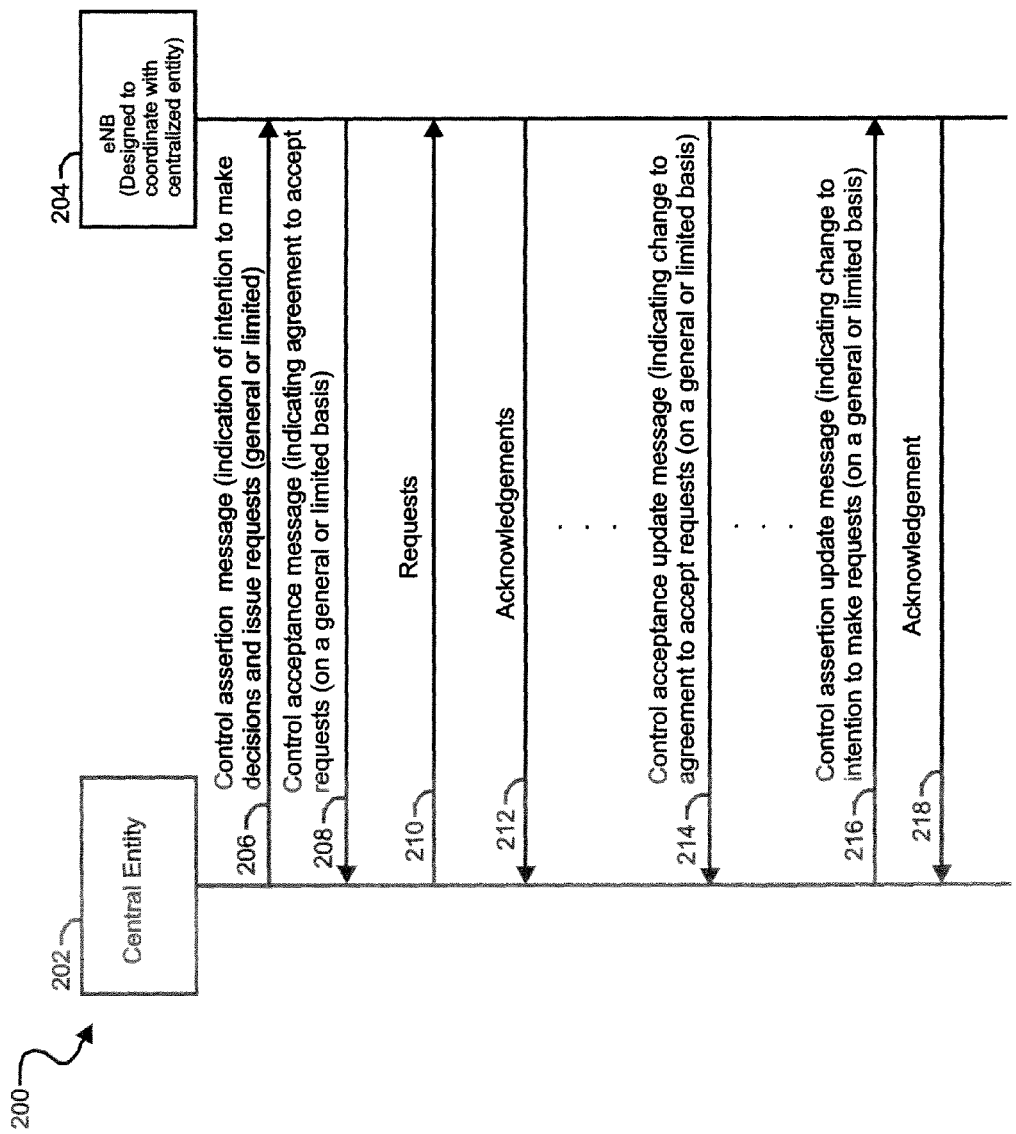
FIGS. 2-6 illustrate signaling between and operations of elements carrying out embodiments of the present invention.

FIG. 2 illustrates a diagram 200 presenting signaling and operations by and between a requesting node, taking the form of a central entity 202, and a responding node, taking the form of an eNB 204. The central entity 202 issues a control assertion message 206, notifying the eNB 204 of its intention to make centrally controlled scheduling requests—either in general, or on a more limited basis, such as per-PKB or per-RBG, or with most resources being subject to central control, but with specified resources being managed autonomously. The eNB 204 responds to the control assertion message 206 with a control acceptance message 208, indicating its agreement to accept centrally controlled scheduling requests—again, either in general or on a more limited basis either general or on a more limited basis. The central entity may then make requests 210 to the eNB 204, which may then respond with acknowledgements 212. At an appropriate subsequent time, the eNB 204 may send a control acceptance update message 214 to the central entity 202, indicating a modification of the requests to which it will respond. At further appropriate subsequent times, the central entity 202 may send a control assertion update message 216 to the eNB 204, indicating a change in the nature of requests it will make (for example, changing the resources that may be subject to a request. The eNB 204 may respond with a modification acceptance message 218.

Figure 3:
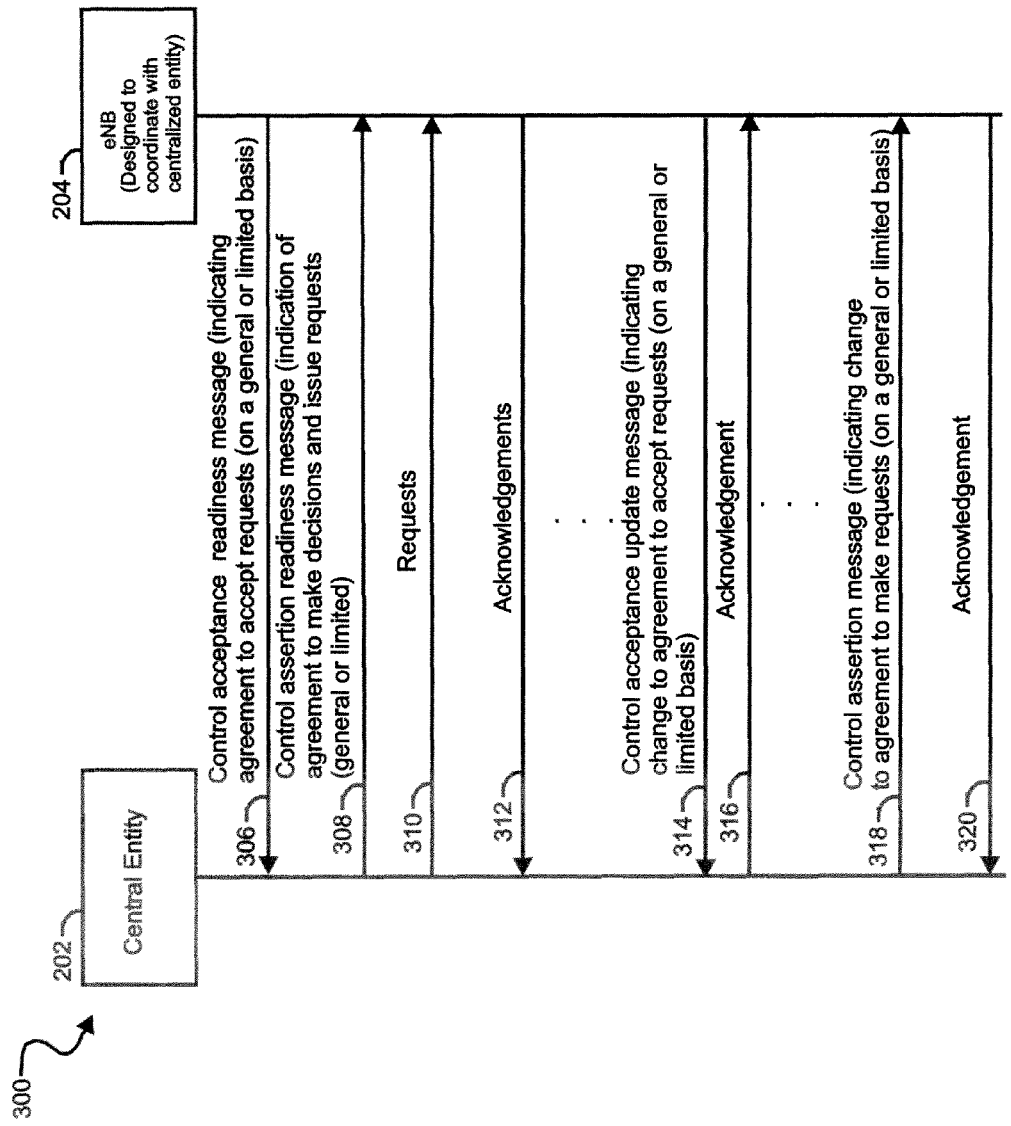

FIG. 3 illustrates a diagram 300, showing interactions between and operations by the central entity 202 and the eNB 204, with the eNB 204 initiating the negotiation. The eNB 204 sends a control acceptance readiness message 306 to the central entity 202, indicating agreement to accept requests. The central entity 202 responds with a control assertion readiness message 308. The central entity 202 then proceeds to make requests 310, and the eNB 204 responds with acknowledgements 312. As needed, the eNB 204 sends a control acceptance update message 314, indicating a change to its agreement to accept requests, and the central entity 202 responds with an acknowledgement 316. Similarly, as needed, the central entity 202 sends a control assertion update message 318, and the eNB 204 responds with an acknowledgement 320.

Figure 4:
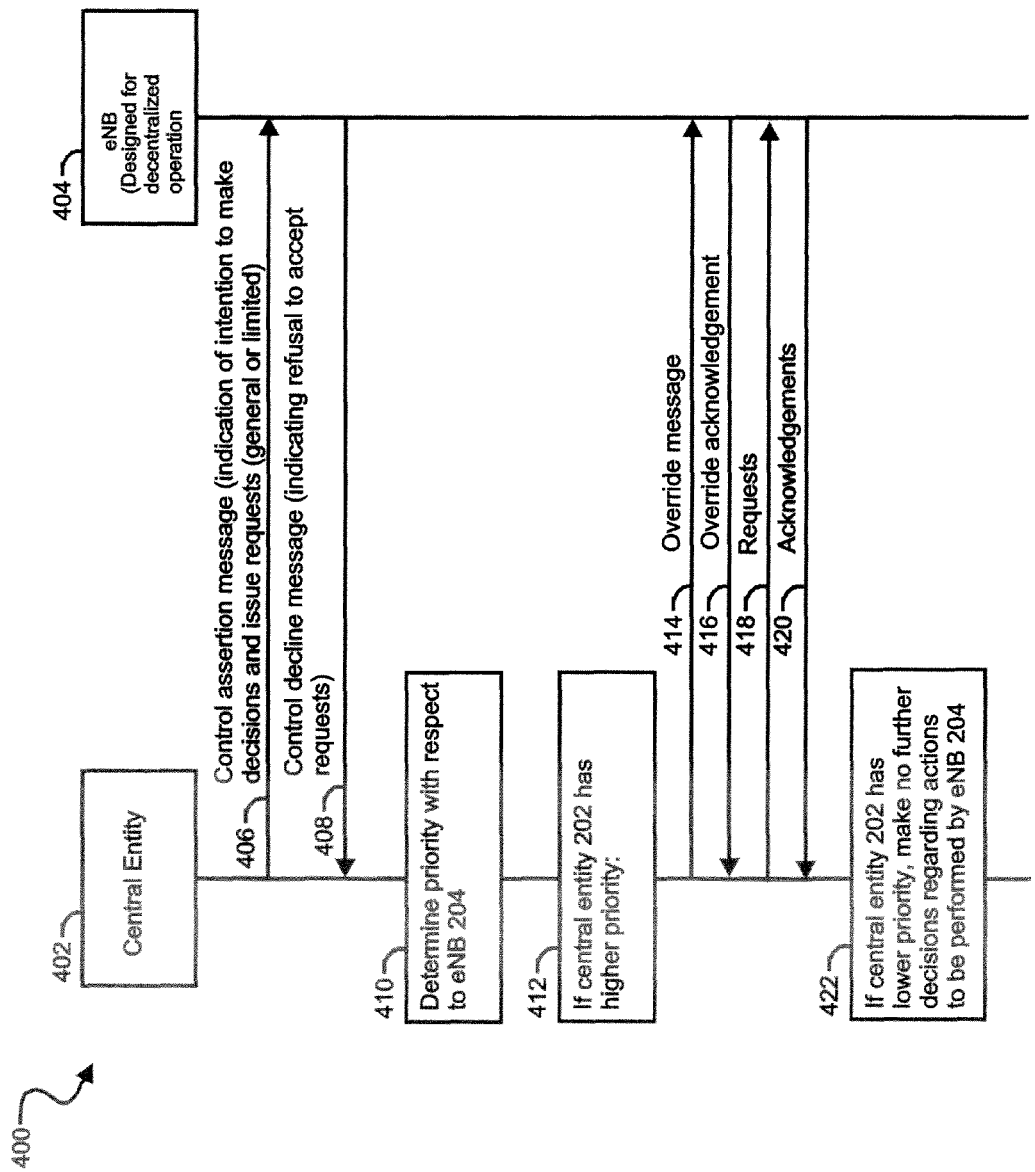

FIG. 4 illustrates a diagram 400 presenting operations of and messages between a central entity 402 and an eNB 404, designed for decentralized operation. The central entity 402 sends a control assertion message 406 to the eNB 404, which responds to the control assertion message 406 with a control decline message 408. The central entity 402 makes a determination 410 of its priority with respect to the eNB 404, and if (412) the central entity 202 has a higher priority, it sends an override message 414 to the eNB 404, which responds with an override acknowledgement 416, and then sends requests 418 which are then responded to with acknowledgements 420. If (422) the central entity 202 has a lower priority than does the eNB 204, the central entity 402 makes no further decisions regarding actions to be performed by the eNB 204.

Figure 5:
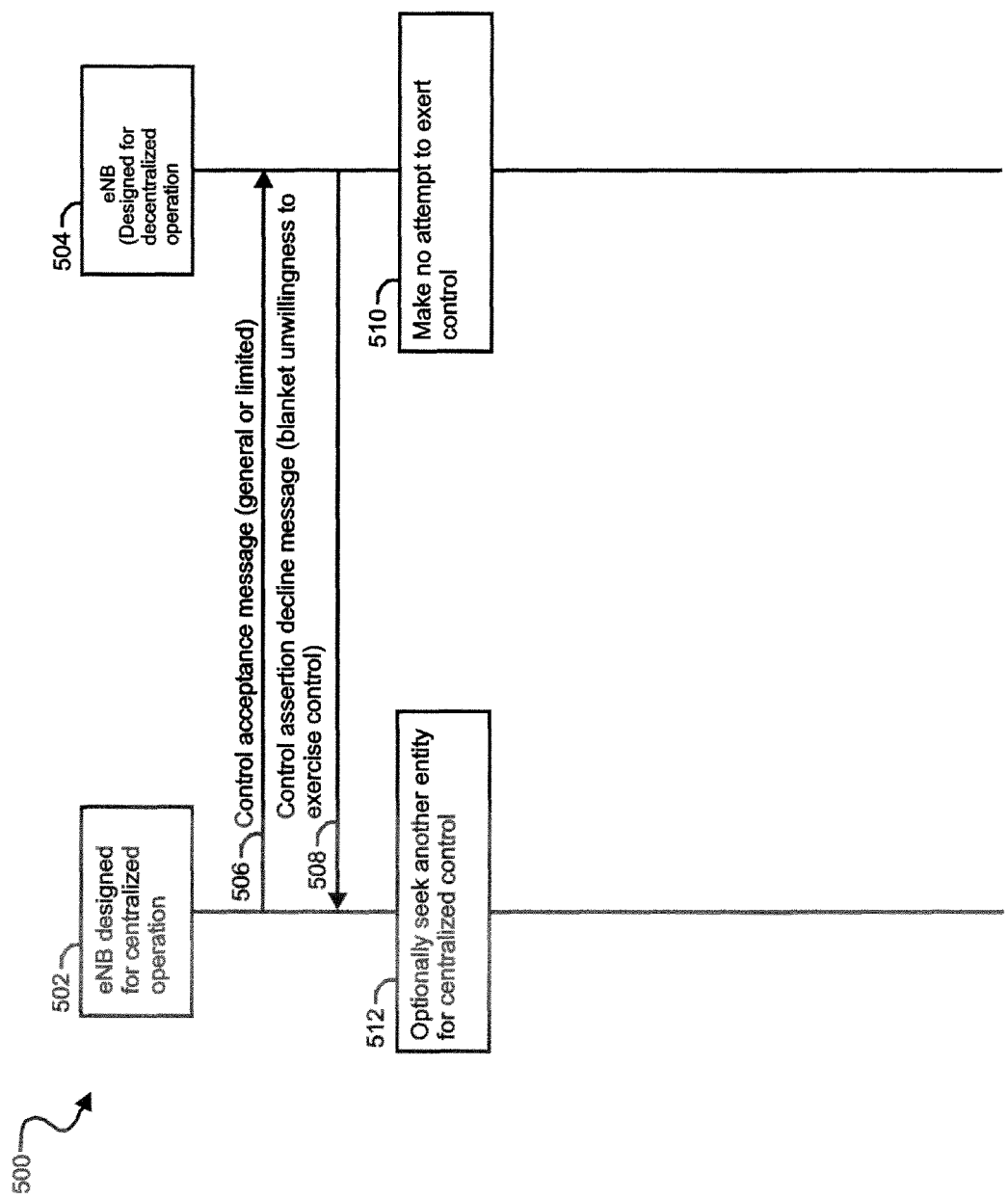

FIG. 5 illustrates a diagram 500 presenting operations of and messages between a first enB 502 and a second eNB 504, with the first eNB 502 being designed for centralized operation and the second eNB 504 being designed for decentralized operation. The first eNB 504 sends a control acceptance message 506, indicating a willingness to accept control, but the second eNB 506 responds with a control assertion decline message 508, indicating an unwillingness to exercise control. The second eNB 504 makes (510) no attempt to exert control and the first eNB optionally seeks (512) another entity for centralized control.

Figure 6:
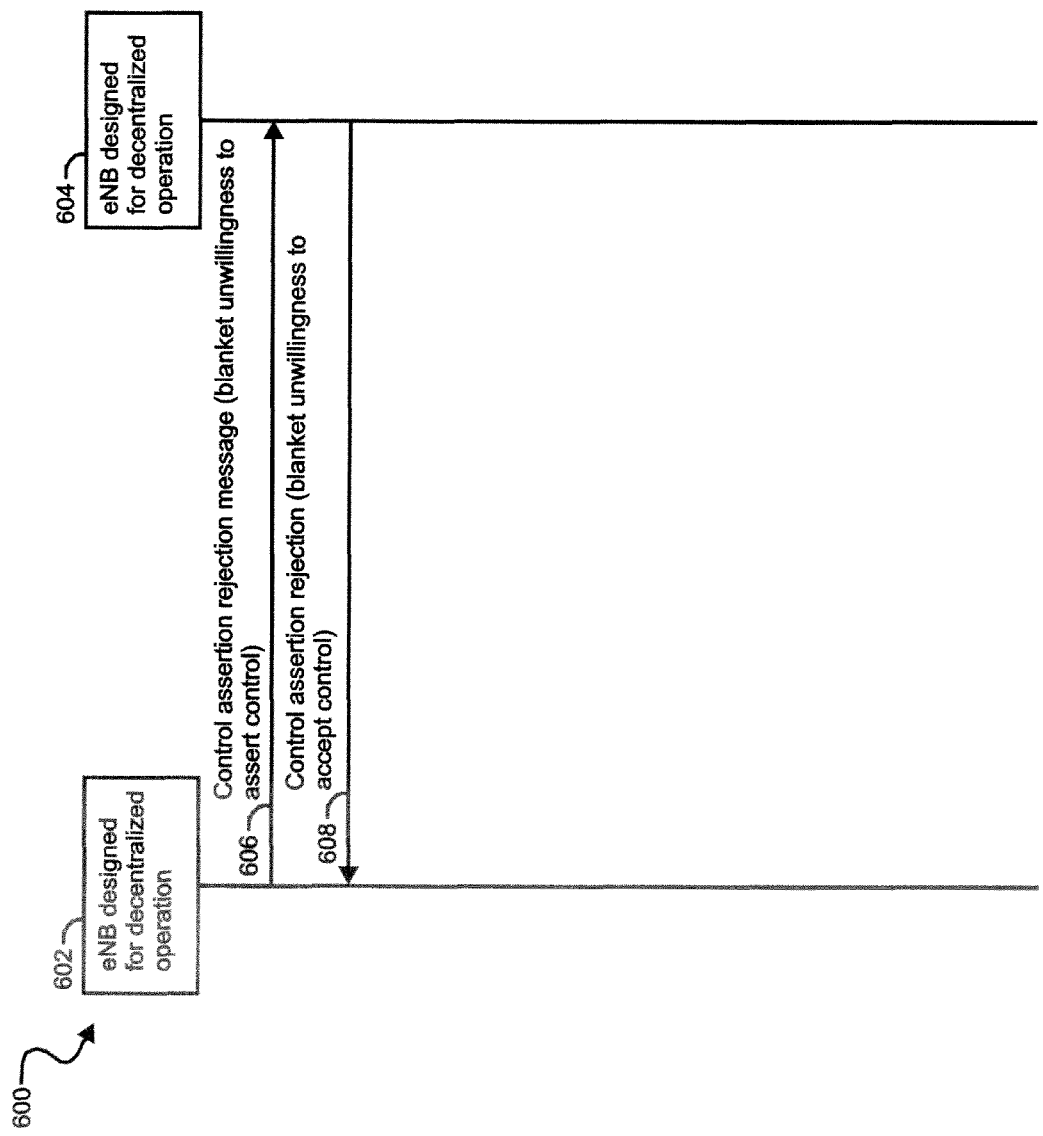

FIG. 6 illustrates a diagram 600 presenting operations of and messages between a first enB 602 and a second eNB 604, with both of the eNBs 602 and 604 being designed for decentralized operation. The first eNB 604 sends a control assertion rejection message 606, indicating an unwillingness to assert control, and the second eNB 606 responds with a control rejection message 608, indicating an unwillingness to accept control.

Figure 7:
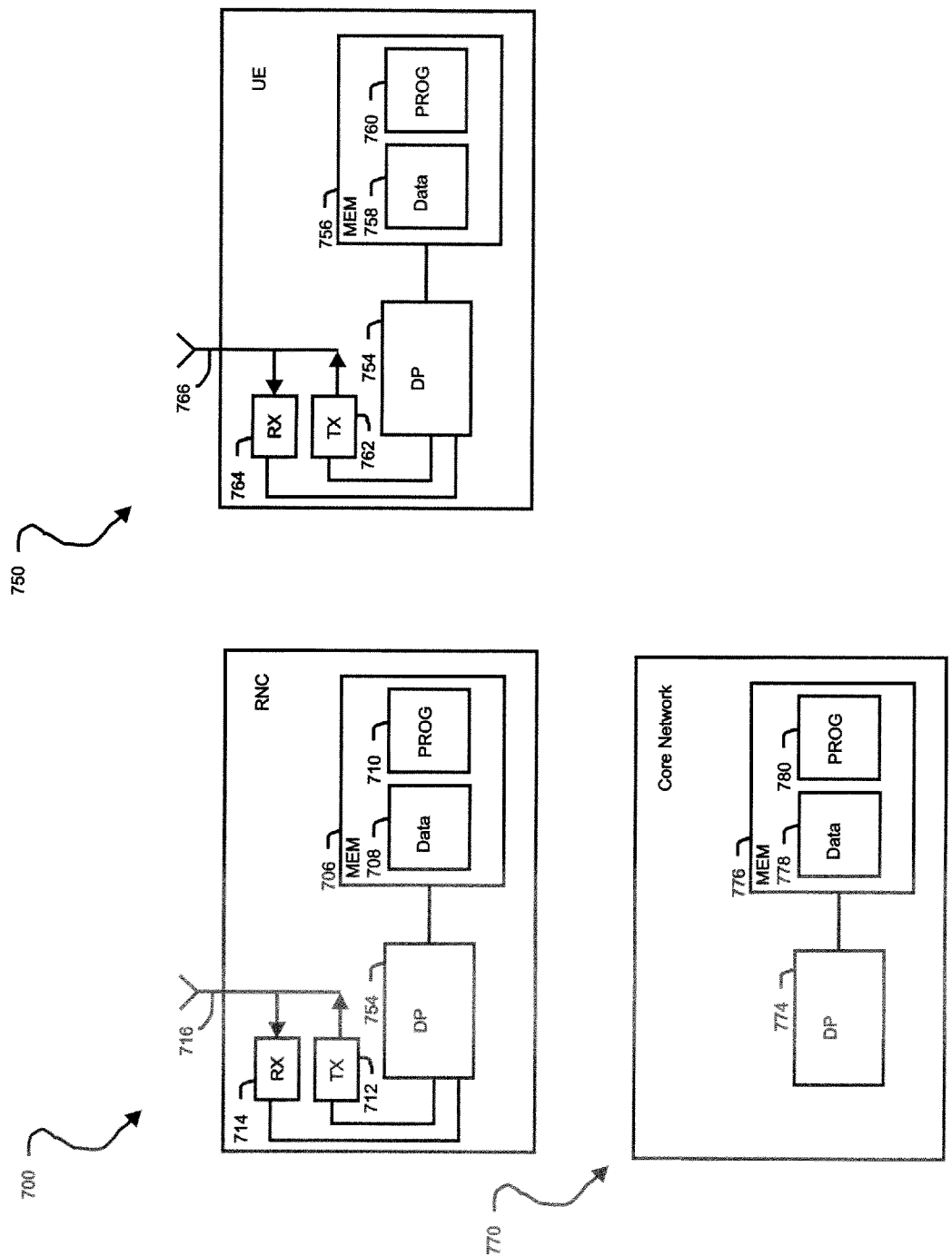
FIG. 7 illustrates details of elements according to an embodiment of the present invention.

Reference is now made to FIG. 7 for illustrating a simplified block diagram of a base station, such an eNB 700 and a user device, such as a UE 750, suitable for use in practicing exemplary embodiments of this invention. In FIG. 7 an apparatus, such as the eNB 700, is adapted for communication with other apparatuses having wireless communication capability, such as the UE 750.

The eNB 700 includes processing means such as at least one data processor (DP) 1204, storing means such as at least one computer-readable memory (MEM) 706 storing data 708 and at least one computer program (PROG) 710 or other set of executable instructions, communicating means such as a transmitter TX 712 and a receiver RX 714 for bidirectional wireless communications with the UE 750 via one or more antennas 716.

The UE 750 includes processing means such as at least one data processor (DP) 754, storing means such as at least one computer-readable memory (MEM) 756 storing data 758 and at least one computer program (PROG) 760 or other set of executable instructions, communicating means such as a transmitter TX 762 and a receiver RX 764 for bidirectional wireless communications with the eNB 1200 via one or more antennas 766.

At least one of the PROGs 710 in the eNB 700 is assumed to include a set of program instructions that, when executed by the associated DP 704, enable the device to operate in accordance with the exemplary embodiments of this invention, as detailed above. In these regards the exemplary embodiments of this invention may be implemented at least in part by computer software stored on the MEM 706, which is executable by the DP 704 of the eNB 700, or by hardware, or by a combination of tangibly stored software and hardware (and tangibly stored firmware). Similarly, at least one of the PROGs 760 in the UE 750 is assumed to include a set of program instructions that, when executed by the associated DP 754, enable the device to operate in accordance with the exemplary embodiments of this invention, as detailed above. Electronic devices implementing these aspects of the invention need not be the entire devices as depicted at FIG. 1 or FIG. 7 or may be one or more components of same such as the above described tangibly stored software, hardware, firmware and DP, or a system on a chip SOC or an application specific integrated circuit ASIC.

In general, the various embodiments of the UE 750 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 706 and 756 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 704 and 754 include but are not limited to general purpose computers, special purpose computers, microprocessors, digital signal processors (DSPs) and multi-core processors.

Figure 8:
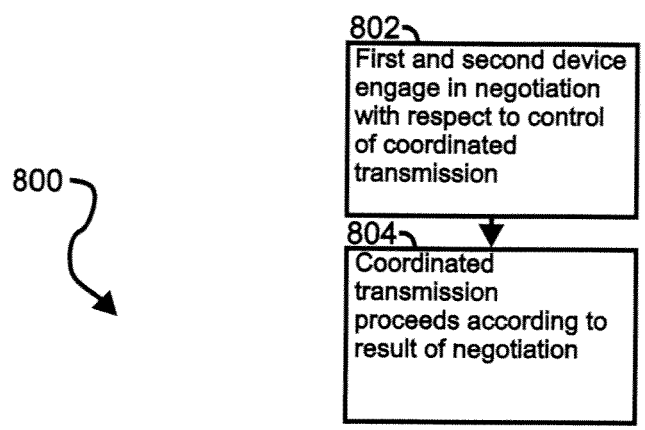
FIG. 8 illustrates a process according to an embodiment of the present invention.

FIG. 8 illustrates a process 800 according to an embodiment of the present invention. At block 802, a first and a second device engage in negotiation to determine whether the first device will control, or will be controlled by, the second device with respect to coordinated transmission. The devices may be, for example, a central entity or a base station, and the negotiation may take the form of an assertion of control and an acceptance or denial, a notification that one device is ready to accept control and an acceptance or denial of assertion or control, or a notification that a device is not ready to accept control, and an acknowledgement. At block 804, coordination proceeds according to the negotiation.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing a program of instructions;
   wherein the memory storing the program of instructions is configured to, with the at least one processor, cause the apparatus to at least:
   in response to a control assertion request to allow a controlling entity to control coordinated radio transmission by the apparatus, respond with an acceptance or denial of the request;
   wherein acceptance or denial is with respect to specified radio resources less than the full bandwidth available for use; and
   wherein coordination of transmission comprises muting of transmission or reduced power transmission, wherein a muted transmission constitutes a zero power transmission.

2. The apparatus of claim 1, wherein the apparatus is further caused to: evaluate relative priorities between the apparatus and the controlling entity to determine the response;
   if the controlling entity has a higher priority, respond with a denial and perform coordinated transmission under control of the controlling entity;
   if the controlling entity has a lower priority, respond with an acceptance and perform transmission autonomously.

3. The apparatus of claim 2, wherein the controlling entity is an eNodeB or an independent node.

4. The apparatus of claim 2, wherein the priority of the controlling entity is configured by a network management function.

5. The apparatus of claim 2, wherein the priority of the controlling entity is negotiated between the controlling entity and an eNodeB.

6. The apparatus of claim 2, wherein priority decisions are made based on criteria so that one or more of the apparatus and the controlling entity has higher priority with respect to particular resources or traffic categories than with other resources or traffic categories.

7. The apparatus of claim 1, wherein the apparatus is an eNodeB.

8. The apparatus of claim 1, wherein coordination of transmission comprises multi-cell coordinated scheduling for avoiding interference between base stations.

9. A method comprising:
   in response to a control assertion request to allow a controlling entity to control coordinated radio transmission by a base station, responding with an acceptance or denial of the request;
   wherein acceptance or denial is with respect to specified radio resources less than the full bandwidth available for use; and
   wherein coordination of transmission comprises muting of transmission or reduced power transmission, wherein a muted transmission constitutes a zero power transmission.

10. The method of claim 9, further comprising:
    evaluating relative priorities between the base station and the controlling entity;
    if the controlling entity has a higher priority, responding with an acceptance and perform coordinated transmission under control of the controlling entity; and
    if the controlling entity has a lower priority, responding with a denial and performing transmission autonomously.

11. The method of claim 10, wherein priority decisions are made based on criteria so that one or more of the apparatus and the controlling entity has higher priority with respect to particular resources or traffic categories than with other resources or traffic categories.

12. The method of claim 9, wherein the base station is an eNodeB.

13. The method of claim 9, wherein coordination of transmission comprises multi-cell coordinated scheduling for avoiding interference between base stations.

14. A non-transitory computer readable medium storing a program of instructions, execution of which by a processor configures an apparatus to at least:
    in response to a control assertion request to allow a controlling entity to control coordinated radio transmission by the apparatus, respond with an acceptance or denial of the request;
    wherein acceptance or denial is with respect to specified radio resources less than the full bandwidth available for use; and
    wherein coordination of transmission comprises muting of transmission or reduced power transmission, wherein a muted transmission constitutes a zero power transmission.

15. The non-transitory computer readable medium of claim 14, wherein execution of the program of instructions further configures the apparatus to:
    evaluate relative priorities between the apparatus and the controlling entity to determine the response;
    if the controlling entity has a higher priority, respond with an acceptance and perform coordinated transmission under control of the controlling entity;
    if the controlling entity has a lower priority, respond with an acceptance and perform transmission autonomously.

16. An apparatus comprising:
    at least one processor;
    memory storing a program of instructions;
    wherein the memory storing the program of instructions is configured to, with the at least one processor, cause the apparatus to at least:
    send a control assertion request to a base station, requesting control of coordinated radio transmission by the base station, wherein coordination of transmission comprises muting of transmission or reduced power of transmission, wherein a muted transmission comprises a zero power transmission; and
    in response to acceptance of the request by the base station, wherein acceptance is with respect to specified radio resources less than the full bandwidth available for use, send one or more requests to the base station to mute transmission.

17. The apparatus of claim 16, wherein the apparatus is further caused to, in response to denial of the request by the base station:
    evaluate relative priorities between the apparatus and the base station;
    if the priority of the apparatus is lower than that of the base station, refrain from attempting to control coordination by the base station; and
    if the priority of the apparatus is higher than that of the base station, send one or more requests to the base station to mute transmission.

18. The apparatus of claim 16, wherein the request for control identifies specified resources for control or exempts specified resources from control.

19. The apparatus of claim 18, wherein the specified resources are physical resource blocks.

20. The apparatus of claim 16, wherein the apparatus is further caused to send an updated control assertion request to the base station, specifying updated control parameters.

\* \* \* \* \*